July 9, 1963

W. A. JONES ETAL 3,097,024

FLUID-SEALING SELF-ALIGNING SHAFT BEARING

Filed Feb. 13, 1962

INVENTORS
WILLIAM A. JONES
R. LANGDON WALES
JOHN F. LEONARD
PHILIP W. DALRYMPLE

BY *Kenway, Jenney & Hildreth*

ATTORNEYS

ପ୍ରtions
United States Patent Office 3,097,024
Patented July 9, 1963

3,097,024
FLUID-SEALING SELF-ALIGNING SHAFT
BEARING
William A. Jones, Boston, R. Langdon Wales, Lincoln, John F. Leonard, Lynnfield, and Philip W. Dalrymple, Wellesley, Mass., assignors to Northrop Corporation, Beverly Hills, Calif., a corporation of California
Filed Feb. 13, 1962, Ser. No. 173,003
7 Claims. (Cl. 308—36.3)

This invention relates to a novel fluid sealing self-aligning shaft bearing, and has as its primary object the provision of an improved shaft bearing which is adapted to support a shaft rotatably in a wall opening for self-alignment of the bearing with the shaft, and for sealing the wall opening against leakage of fluid therethrough. It is a further object of the invention to provide, in a fluid-sealing shaft bearing of the type having flexible sealing members which may burst if subjected to differential pressures in excess of design values, means operative upon a seal failure to prevent leakage of fluid through the bearing. Further objects and advantages of the invention will become apparent as the following description proceeds.

In general, we may carry out our invention in a preferred embodiment thereof, by providing a sleeve for rotatably receiving a shaft within a cylindrical bearing surface thereof, together with a housing circumferentially spaced about the sleeve and shaft and mounted in sealing engagement with an opening of the wall through which the shaft passes. The bearing is arranged to seal a wall opening against leakage of fluids subjected to substantial pressures, and is therefore particularly adapted for use as a shaft bearing in submarines and other vessels, in which a shaft opening in a hull must be sealed against leakage of sea water into the interior of the vessel, although its utility is not limited to such applications. We enclose a fluid-tight chamber between the sleeve and the housing, and flexibly support the sleeve therein for self-aligning movement with the shaft, by means of a pair of flexible annular sealing members each of whose inner and outer peripheral portions are secured in sealing engagement with the sleeve and the housing, respectively. The sleeve is formed with opposed hydraulic fluid pressure surfaces extending transversely to the axis of rotation of the shaft; a first one of these pressure surfaces is exposed to an external fluid ambient to one side of the wall, such as sea water, while a second one of the pressure surfaces is exposed to a supply of hydraulic pressure fluid contained within the chamber of the bearing. The tendency of the external fluid pressure to drive the sleeve axially of the shaft toward the second side of the wall is opposed by the compression of the hydraulic fluid within the chamber, and the sleeve is thus supported in axially-spaced relation in the housing, while being free to cant or to move transversely to maintain its alignment with the shaft.

We may provide a pressure accumulator for limiting the pressure of the hydraulic fluid within the chamber to a preselected maximum. This pressure is preferably of a value in excess of the maximum external fluid pressure which may be anticipated. This arrangement permits some axial movement of the sleeve to take place when the pre-selected pressure has been exceeded by the external pressure, through displacement of hydraulic fluid from the chamber to the accumulator; and accommodates the operation of the safety device comprising a further feature of the invention, which seals the bearings against fluid leakage in the event of bursting of either of the annular seals. Alternatively, the fluid, the annular seals, and the housing may severally or collectively be designed or selected to provide sufficient compliance so that when the pre-selected pressure level has been exceeded by the external pressure, the sleeve will have moved axially to accommodate the operation of the safety device.

According to this safety feature, the sleeve and the housing are provided with axially-aligned sealing surfaces extending within the chamber transversely to the axis of rotation of the shaft. These surfaces are axially spaced apart in a normal juxtaposition of the sleeve to the housing, and define portions of the fluid chamber which communicate through the annular clearance space which normally exists between the sealing surfaces. However, in either of the abnormal events that the external fluid pressure acting upon the first surface of the wall exceeds the pre-selected pressure of the hydraulic fluid in the chamber, or either of the flexible seals is ruptured, the sleeve is driven axially by the external fluid pressure in a direction to seat the sealing surfaces in sealing engagement. In the event a seal has been ruptured, this action prevents leakage of fluid through the bearing; if, on the other hand, the seals have not ruptured, the seating of these surfaces serves to limit the axial movement and avert stretching of the flexible seals to the point of mechanical disruption. We prefer to form the sealing surfaces as mating spherical segments, so that canting self-aligning movement of the sleeve about axes normal to the axis of rotation of the shaft may occur even though the sealing surfaces are engaged. If however, the angular motions of the sleeve within the housing are small, so that only narrow spherical segments are required, adequate sealing may be obtained by the use of conical surfaces extending tangent to the respective spheres.

According to still another feature of the invention, we may dispose a perforated flexible annular diaphragm within the chamber, and secure this diaphragm about its inner and outer peripheries upon the sleeve and the housing, respectively. This diaphragm permits a free flow of hydraulic fluid within the chamber through the perforations, but radially restrains the sleeve at one point along its axis, while permitting canting self-aligning movement about axes which are normal to the axis of rotation of the shaft and pass through that point.

While the specification concludes with claims particularly pointing out and distinctly claiming the subject matter which we regard as our invention, it is believed that the invention will be more clearly understood from the following detailed description of a preferred embodiment thereof, referring to the accompanying drawings, in which:

Figure 1:
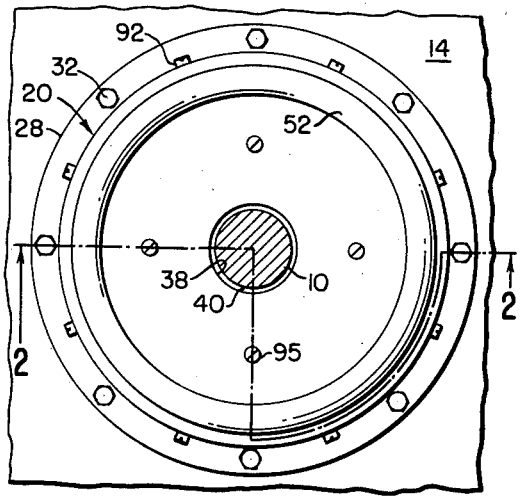
FIG. 1 is an end view of the bearing assembled with a shaft extending through a wall opening.
Figure 4:
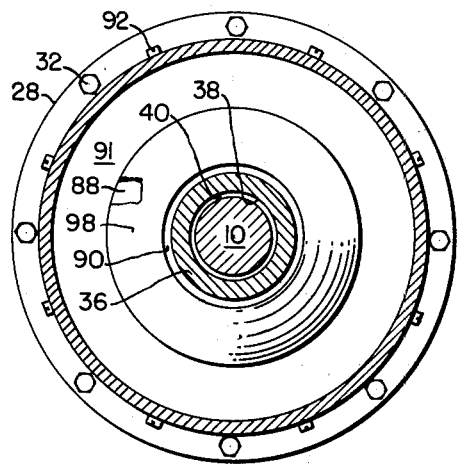
FIG. 4 is a sectional view taken along line 4—4 in FIG. 2, looking in the direction of the arrows.

Referring to the drawings, a preferred embodiment of the improved bearing is shown in operative relation to a shaft 10 passing through an opening 12 in a wall 14, which separates a volume of a first external fluid 16, ambient to a first side of the wall, from a volume of a second external fluid 18, ambient to the second side of the wall. For example, the wall 14 may comprise the hull of a submarine or other vessel, separating a volume of sea water 16 from an enclosed air space 18. The bearing is provided to rotatably support the shaft in the wall opening while preventing leakage of the external fluids through the opening, under differential pressures which may vary widely. The bearing is also arranged to align itself with the shaft as the latter cants about axes normal to its axis of rotation, or "whips" radially thereto.

The improved bearing includes a housing 20 which is hollowed to define an hydraulic fluid chamber 22 therein, and for convenience in assembly, is formed with a first cylindrical portion 24 joined to an annular portion 26 by means of circumferentially extending flanges 28 and 30 formed in these portions, respectively. The housing is secured in assembled relation and attached in fluid-sealing engagement about the periphery of the opening 12 by means of a row of threaded fasteners 32 spaced circumferentially about the flanges. The housing portion 26 terminates in a flange 34 extending circumferentially about the shaft 10.

A cylindrical sleeve 36 is formed with an internal bearing surface 38, which receives the shaft 10 rotatably therein in a manner to seal a clearance space 40 extending circumferentially between the sleeve and the shaft against flow of the external fluids therethrough. The bearing is preferably of a hydrostatic type as shown, having a series of rows of pocket recesses 42 formed thereabout for admitting a controlled flow of hydraulic fluid to the clearance space 40 to maintain the sleeve in centered relationship about the shaft while sealing the clearance space against inflow of external fluid; a pair of rows of outlet ports 44 are spaced near the axial ends of the sleeve to receive the hydraulic fluid for discharge from the bearing. To supply a controlled recirculating flow of hydraulic fluid to the bearing, a suitable fluid system (not shown) is provided; systems of this type are well known in the art, and because the specific form of the bearing forms no part of the present invention, no further detailed description thereof is believed necessary. Plain bearings or roller bearings, having means for sealing to prevent external fluid leakage, may be substituted for the hydrostatic bearing arrangement if desired.

In operation for driving a propeller or the like, the shaft 10 tends to cant about axes normal to the axis of rotation. The sleeve tends to follow these movements, and according to the invention is mounted in a manner which accommodates this self-aligning movement while sealing the opening in the wall 14. The sleeve 36 terminates in a circumferential flange 46, forming a first fluid pressure surface 48 exposed to the external fluid 16, and a second fluid pressure surface 50 exposed to the hydraulic fluid contained within the chamber 22. In the preferred form of the sleeve shown, the area of the surface 48 is somewhat larger than the area of the surface 50, although this is not essential to the practice of the invention. A pair of flexible annular sealing members 52 and 54 are provided to enclose the chamber 22 in cooperation with the housing and the sleeve, and to seal communication between the fluids 16 and 18 and the interior of the chamber. The seals are secured in fluid-sealing engagement about their inner and outer peripheries with the sleeve 36 and the housing 20, respectively, by means of a plurality of rings 56, 57, 58, and 59 and corresponding circumferential rows of machine screws 60.

A pressure accumulator 62, having a fluid-sealing diaphragm 64 to form fluid chambers 66 and 68 in pressure-transmitting relation therein, is provided in the preferred embodiment shown to permit movement of the sleeve 36 axially of the housing 20 while maintaining a pre-selected pressure within the chamber 22. A conduit 69 communicates with the chamber 66 for the establishment by suitable means (not shown) of a pre-selected air pressure therein, while the chamber 68 communicates with the chamber 22 of the bearing by means of a conduit 70. The pressure of the fluid is preferably pre-selected at a value slightly greater than the maximum pressure of the fluid 16 which is expected to be encountered. The fluid pressure acts against the pressure surface 50 of the sleeve in opposition to the external pressure of the fluid 16, normally to support the sleeve in axially-spaced relation to the housing for self-aligning movement of the sleeve with the shaft.

To dampen radial "whip" (oscillatory vibration) of the shaft, we restrain the sleeve 36 radially by means of a flexible annular diaphragm 72, which is secured about its inner periphery to a circumferential flange 74 formed in the sleeve by means of a ring 76 and a plurality of threaded fasteners 78. The diaphragm is secured about its outer periphery between the flanges 28 and 30, which extend radially inwardly of the housing for this purpose, by means of a circumferential row of threaded fasteners 80. The diaphragm is formed with a plurality of perforations 82 to permit hydraulic fluid to flow freely therethrough within the chamber 22. The diaphragm resiliently restrains radial movement of the sleeve at their point of mutual engagement, and thus restricts canting movement of the sleeve to occurrence about axes transverse to the axis of rotation of the shaft and lying in the radial plane of attachment of the diaphragm.

Figure 2:
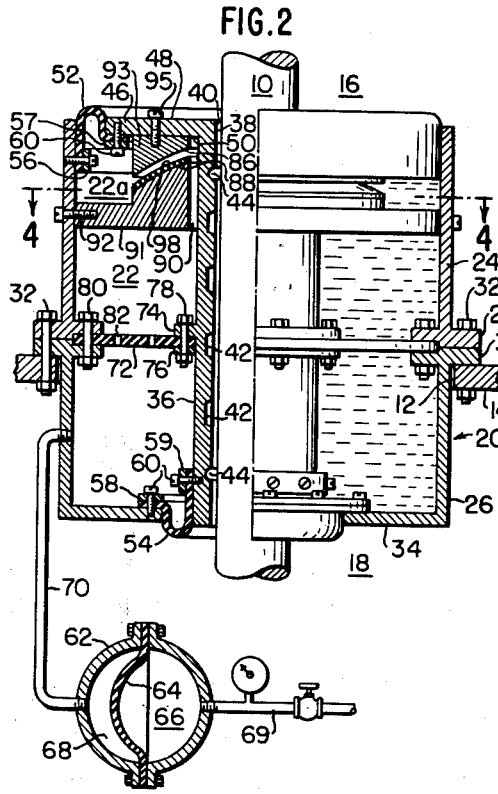
FIG. 2 is a sectional view taken along line 2—2 in FIG. 1, looking in the direction of the arrows, showing a sleeve and a housing in a normal juxtaposition.

In the event that sea pressures are encountered which are substantially greater than the pre-selected pressure of the hydraulic fluid in the chamber 22, the differential in the pressures exerted oppositely upon the flange 46 tends to drive the sleeve axially downwardly as viewed in FIG. 2, and might rupture the sealing members 52 and 54 if not limited. Rupture of the sealing members from this or any other cause could result in leakage of the fluid 16 through the bearing to the interior of the wall 14. To limit the range of movement of the sleeve, and to seal the bearing against leakage in the event of rupture of a sealing member, we provide the housing and the sleeve with sealing surfaces 86 and 88, respectively, which are axially spaced apart in the normal juxtaposition of the sleeve and the housing shown in FIG. 2. The surface 88 is formed on an annular member 91 having a central bore 90; the clearance space between the surfaces 86 and 88 normally communicates the chamber 22 with a portion 22a thereof adjacent the sealing member 52, through the bore 90. The member 91 is secured peripherally in fluid-sealing engagement with the interior surface of the housing by means of a circumferential row of machine screws 92. The surface 86 is formed in a further annular member 93, secured upon the surface 50 of the flange 46 by means of the circumferential row of machine screws 95. We prefer to form the surfaces 86 and 88 as mating spherical segments, and to secure a surface layer of resilient material 98 circumferentially upon the surface 88.

Figure 3:
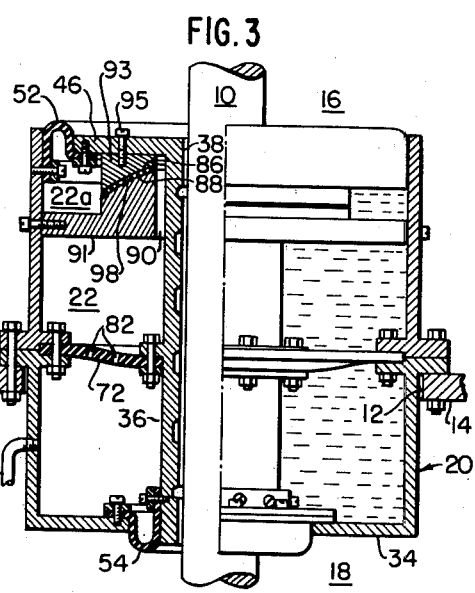
FIG. 3 is a view corresponding to FIG. 2, but showing the parts of the bearing in an abnormal juxtaposition in which sealing surfaces are engaged to limit the axial movement of the sleeve.

In the event that the pressure of the fluid 16 substantially exceeds the pre-selected pressure of the fluid in the chamber 22, such as may occur when a submarine dives to a depth greater than that for which the hydraulic fluid pressure is selected, the unbalanced pressure upon the flange 46 drives the sleeve toward the position shown in FIG. 3. The sealing engagement of the surfaces 86 and 88 terminates this movement and discontinues fluid communication between the chamber 22 and its portion 22a, the sealing action being supplemented by the resilient sealing layer 98. The spherical configuration of the surfaces 86 and 88 permits the sleeve to cant about axes lying in a plane normal to the axis of rotaton of the shaft and passing through the center of the sphere, to permit self-aligning movement of the sleeve to occur in spite of the excess exterior pressure of the fluid 16. However, the sealing surfaces 86 and 88 may be otherwise formed if desired.

In the event of rupture of the sealing element 52, the chamber 22 and the interior surface of the wall 14 will be similarly sealed, by seating of the surfaces 86 and 88, against leakage of the fluid 16 thereto. If a rupture of the seal 52 occurs at a time when the pressure of the fluid 16 is less than that of the hydraulic fluid 22, the hydraulic fluid will escape through the sealing member until the external pressure is sufficiently great to seat the sealing surfaces 86 and 88, thus preventing leakage of the external fluid into the bearing. In the event of rupture of the sealing member 54, the loss of hydraulic fluid pressure from the chamber 22 permits the unbalanced pressure of the fluid 16 to drive the sleeve into sealing engagement of the surfaces 86 and 88.

The arrangement of the sealing surfaces thus protects the bearing against leakage therethrough of the external fluid 16 in case of rupture of either of the sealing members 52 or 54, and limits the axial movement of the sleeve to protect the sealing members against mechanical rupture upon encountering an external fluid pressure in excess of the design value.

While we have illustrated and described a preferred embodiment of our invention by way of illustration, it will be apparent to those skilled in the art that various changes and modificaions may be made without departing from the true spirit and scope of the invention. We therefore intend to define our invention in the appended claims without limitation to specific details of construction and arrangement referred to in the foregoing description.

What we claim and desire to secure by Letters Patent of the United States is:

1. A self-aligning bearing for rotatably supporting a shaft extending through an opening in a wall, and for sealing the opening against leakage therethrough of fluids ambient to opposite sides of the wall and subject to a difference in pressures, said bearing comprising, in combination: a sleeve having a cylindrical bearing surface for slidably receiving a shaft rotatably therethrough, a portion of said sleeve forming opposed hydraulic fluid pressure surfaces extending transversely to the major axis of said cylindrical bearing surface; an annular housing circumferentially spaced about said sleeve and attachable in fluid-tight relation in an opening in a wall; a first flexible annular sealing member secured about inner and outer peripheries thereof to said sleeve and said housing, respectively; a further flexible annular sealing member secured about inner and outer peripheries thereof to said portion of said sleeve intermediate said pressure surfaces and to said housing respectively, said sealing members defining a chamber between said sleeve and said housing; a quantity of hydraulic fluid being enclosed in said chamber to act upon one of said pressure surfaces in opposition to ambient fluid pressure exerted upon the other of said pressure surfaces to support said sleeve in axially-spaced relation to said housing for freedom of self-alignment with a shaft received in said bearing surface.

2. A self-aligning bearing as recited in claim 1, together with a pressure accumulator for subjecting hydraulic fluid in said chamber to a pre-selected pressure, said accumulator including expansible chamber means in communication with said chamber for receiving hydraulic fluid displaced from said chamber by axial movement of said sleeve in a direction to engage said sealing surfaces.

3. A self-aligning bearing as recited in claim 1, together with a flexible perforated diaphragm disposed within said chamber, said diaphragm extending between and secured upon spaced-apart portions thereof to said housing and said sleeve, to resiliently restrain said sleeve against movement radially of said major axis in the portion thereof attached to said diaphragm, and to accommodate canting movement of said sleeve about axes normal to said major axis and passing through said diaphragm.

4. A self-aligning bearing as recited in claim 1, together with a first annular portion provided in said housing and a second annular portion provided in said sleeve, said annular portions formed with mating sealing surfaces extending within said chamber transversely to said major axis, said surfaces being axially spaced apart in a normal juxtaposition of said sleeve and said housing, and sealingly engaging upon an axial movement of said sleeve in a direction from said other toward said one of said pressure surfaces.

5. A self-aligning bearing as recited in claim 4, wherein the compliances of the fluid, said flexible sealing members, and the portions of said sleeve and said housing defining said chamber, are selected to permit axial movement of said sleeve into engagement with said sealing surfaces when said ambient fluid pressure exceeds the hydraulic fluid pressure in said chamber.

6. A self-aligning bearing as recited in claim 4, in which said sealing surfaces are formed as mating spherical segments for relative canting movement of said sleeve and said housing in an engaged relation of said surfaces to accommodate self-aligning canting movement of said sleeve with a shaft received therein.

7. A self-aligning bearing for rotatably supporting a shaft extending through an opening in a wall, and for sealing the opening against leakage therethrough of fluids ambient to opposite sides of the wall and subject to a difference in pressures, said bearing comprising, in combination: a sleeve having a cylindrical bearing surface for slidably receiving a shaft rotatably therethrough, said sleeve having a first flange extending circumferentially thereabout to form opposed hydraulic fluid pressure surfaces extending transversely to the major axis of said cylindrical bearing surface; an annular housing circumferentially spaced about said sleeve and attachable in fluid-tight relation in an opening in a wall, said housing being formed with a further flange extending internally thereof circumferentially about said sleeve; a first flexible annular sealing member secured about inner and outer peripheries thereof to said first flange and said housing, respectively; a further flexible annular sealing member secured about inner and outer peripheries thereof to said sleeve and said second flange, respectively; said sealing members defining a chamber between said sleeve and said housing; a quantity of hydraulic fluid being enclosed in said chamber to act upon one of said pressure surfaces exposed to said chamber in opposition to ambient fluid pressure exerted upon the other of said pressure surfaces to support said sleeve in axially-spaced relation to said housing for freedom of self-alignment with a shaft received in said bearing surface.

References Cited in the file of this patent

UNITED STATES PATENTS 2,881,032    Connolly _____ Apr. 7, 1959